Sept. 25, 1962 L. G. SIMJIAN 3,056,133
DEPOSITORY MACHINE
Original Filed Nov. 20, 1956 6 Sheets-Sheet 1
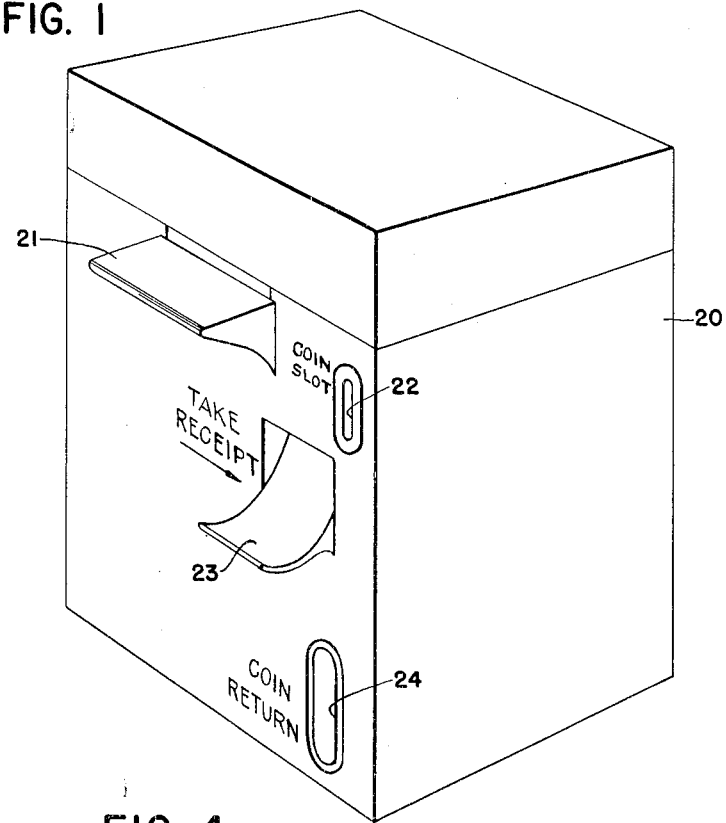
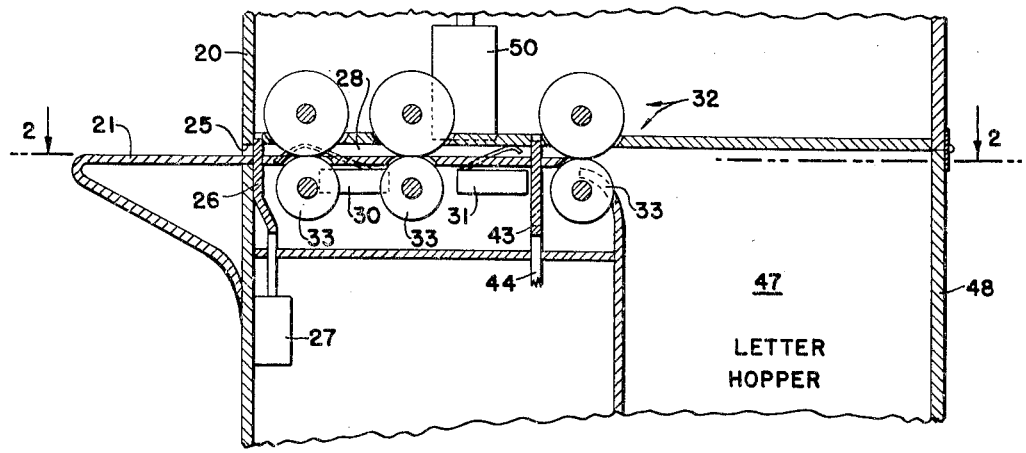
LUTHER G. SIMJIAN
INVENTOR
BY *Ervin B. Steinberg*

Sept. 25, 1962

L. G. SIMJIAN 3,056,133

DEPOSITORY MACHINE

Original Filed Nov. 20, 1956

LUTHER G. SIMJIAN
INVENTOR

BY Ervin B. Steinberg

Sept. 25, 1962   L. G. SIMJIAN   3,056,133
DEPOSITORY MACHINE
Original Filed Nov. 20, 1956   6 Sheets-Sheet 3

LUTHER G. SIMJIAN
INVENTOR

BY Erwin B. Steinberg

Sept. 25, 1962

L. G. SIMJIAN 3,056,133

DEPOSITORY MACHINE

Original Filed Nov. 20, 1956

LUTHER G. SIMJIAN
INVENTOR

BY Ervin B. Steinberg

Sept. 25, 1962 L. G. SIMJIAN 3,056,133
DEPOSITORY MACHINE
Original Filed Nov. 20, 1956 6 Sheets-Sheet 5

LUTHER G. SIMJIAN
INVENTOR

Sept. 25, 1962   L. G. SIMJIAN   3,056,133
DEPOSITORY MACHINE
Original Filed Nov. 20, 1956   6 Sheets-Sheet 6

47
DEPOSITORY

LUTHER G. SIMJIAN
INVENTOR
BY Erwin B. Steinberg

United States Patent Office 3,056,133
Patented Sept. 25, 1962

3,056,133
DEPOSITORY MACHINE
Luther G. Simjian, Greenwich, Conn., assignor to Universal Match Corporation, Ferguson, Mo., a corporation of Delaware
Original application Nov. 20, 1956, Ser. No. 623,364, now Patent No. 2,960,377, dated Nov. 15, 1960. Divided and this application Mar. 28, 1960, Ser. No. 18,106
8 Claims. (Cl. 346—22)

This application is a divisional application of copending application for U.S. Letters Patent, Serial No. 623,364, filed November 20, 1956, now U.S. Patent No. 2,960,377, issued November 15, 1960.

This invention relates to a depository machine which receives articles or envelopes containing letters or money and automatically issues a receipt for the article deposited. It has particular reference to a recording means which identifies the article and means for issuing an identifying ticket exterior to the machine. The invention also has reference to a recording means within the machine for making a complete record of all the articles deposited.

As used throughout the specification and claims, the term "article" refers to a container which may include a closed bag containing coins, or any other closed receptacle commonly used to transport and store valuable papers and money.

One application of the invention is directed to depositing registered mail in post office lobbies when no clerk is available. The present procedure of registering mail requires the presence of a clerk who makes out a receipt for the person who mails the letter or package and also makes a record for the post office. This procedure is time consuming and its operation is limited to those times when a clerk is available and the post office is open. The present invention not only permits mailing of registered letters when clerks are not available but also speeds up the flow of registered mail when the post office is open since it is not necessary to make out receipts and record data by hand when the machine is in operation.

An alternate arrangement of the invention includes a camera similar to a microfilm recording camera which takes a picture of both sides of the deposited article after the registered number and other identifying data have been placed on the envelope. This operation produces a permanent record of all registered mail passing through the post office and includes all markings on the article or envelope in addition to the registered number.

Another alternate arrangement of the invention is designed for use by banks and includes the usual night depository box, operated by a key and a recording means which includes a camera for taking a picture of the deposited article and of a scale which weighs the article or bag and shows the weight on a dial suitably disposed for photography by the camera. This machine also issues a receipt exterior to the machine which is identified by data which also appear on the camera film.

One of the objects of this invention is to provide an improved depository machine which avoids one or more of the disadvantages and limitations of prior art arrangements.

Another object of the invention is to provide a depository machine which will accept registered mail and deliver an identifying ticket as a receipt without the presence of a clerk.

Another object of the invention is to shorten the time necessary for mailing a registered letter.

Another object of the invention is to provide a uniform list of identifying numbers on a tape within the machine which is available only to the post office authorities for their records.

Another object of the invention is to take a microfilm picture of each registered letter.

Another object of the invention is the issuance of an identifying ticket for each envelope deposited in the night depository box of a bank.

Another object of the invention is to photographically record an image of the envelope deposited and at the same time record an image of an indicating means showing the weight of the envelope.

The invention includes a receiving means having a recording chamber where the envelope is stamped with identifying data and a ticket storing means which is controlled by the mechanism associated with the recording chamber. The machine also includes a ticket dispensing means which moves an identifying ticket to a position accessible to depositor whenever an envelope is deposited in the machine.

Another feature of the invention includes a mechanism for recording the weight of an envelope deposited in the machine.

For a better understanding of the present invention, together with other and further objects thereof, reference is made to the following description taken in connection with the accompanying drawings.

FIG. 1 is a perspective view of the machine designed for registered letters.

FIG. 4 is a partial cross sectional view of the recording chamber taken along line 4—4 of FIG. 2.

Figure 7:
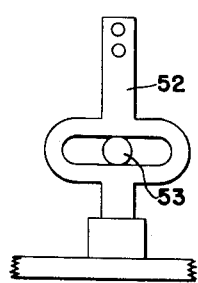
Figure 8:
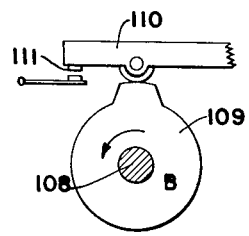
Figure 9:
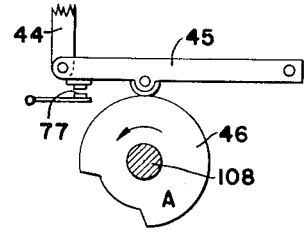

FIGS. 7, 8, and 9, are side views of cams which control the machine operations.

Figure 3:
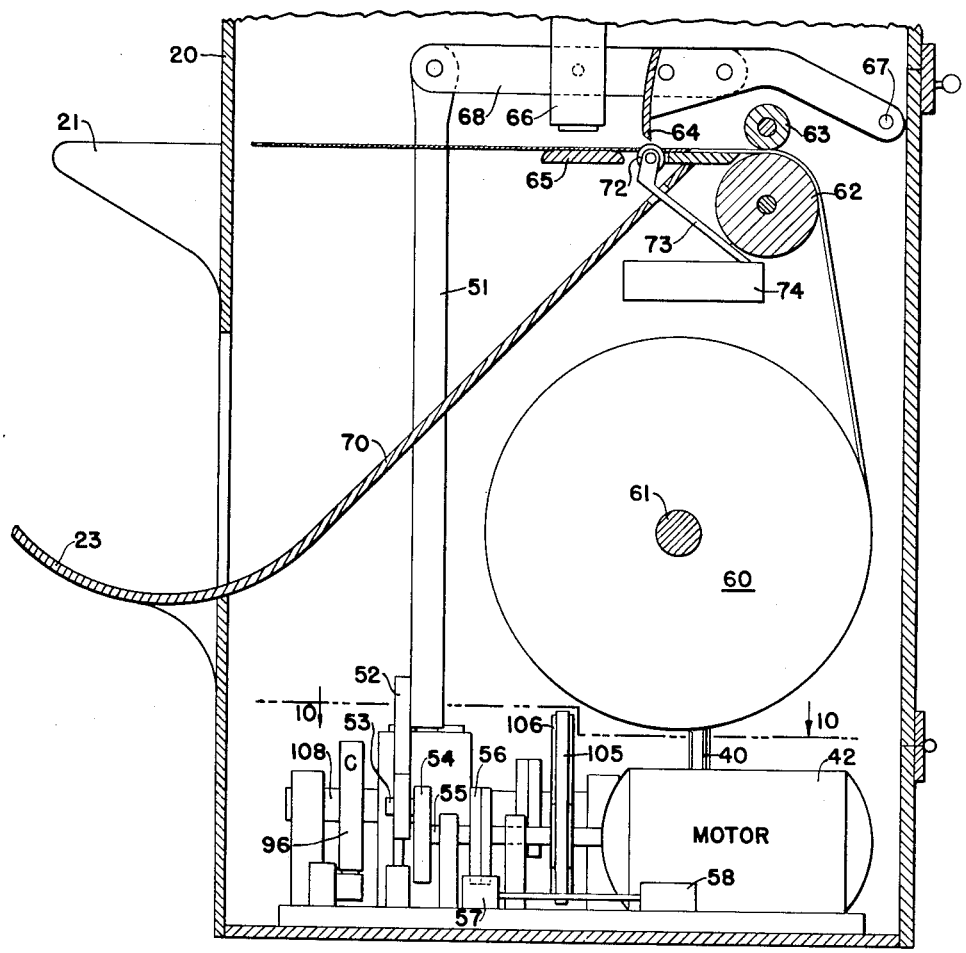
FIG. 3 is a cross sectional view taken along line 3—3 of FIG. 2 and shows the ticket dispensing means and a side view of the control mechanism at the base of the machine.
Figure 10:
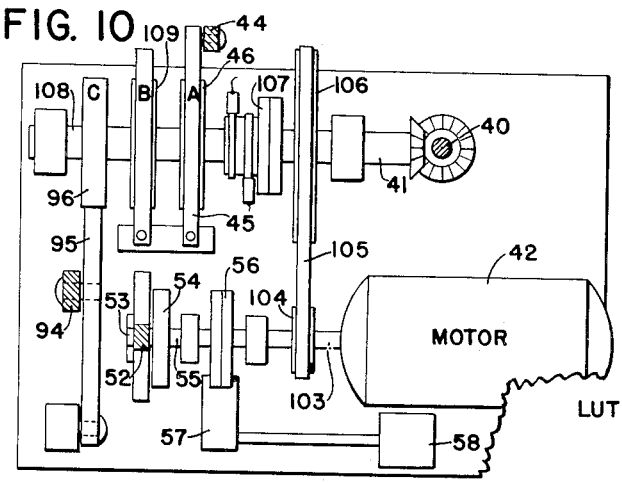

FIG. 10 is a plan view of the control elements, with some parts in section, this view being taken generally along line 10—10 of FIG. 3.

Figure 11:
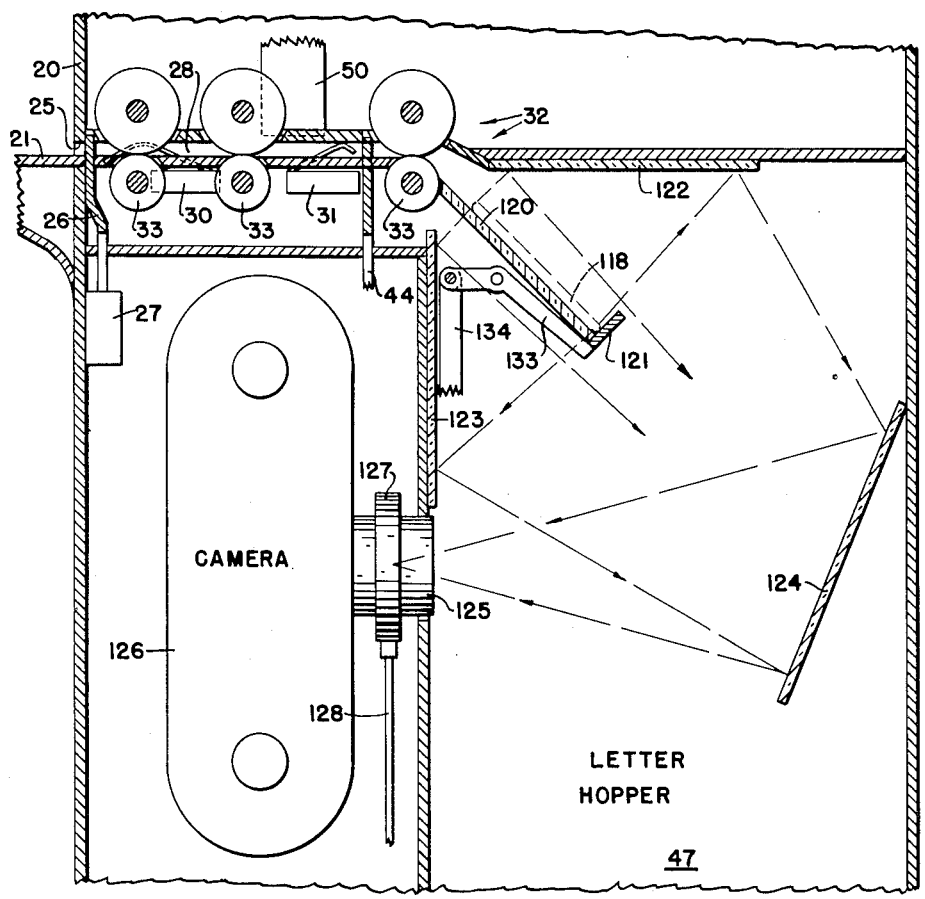

FIG. 11 is a cross sectional view of the receiving means and recording chamber of an alternate form of the invention and shows a camera which photographs both sides of a deposited envelope.

Figure 12:
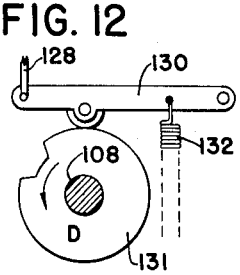
Figure 13:
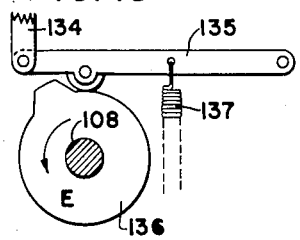
Figure 14:
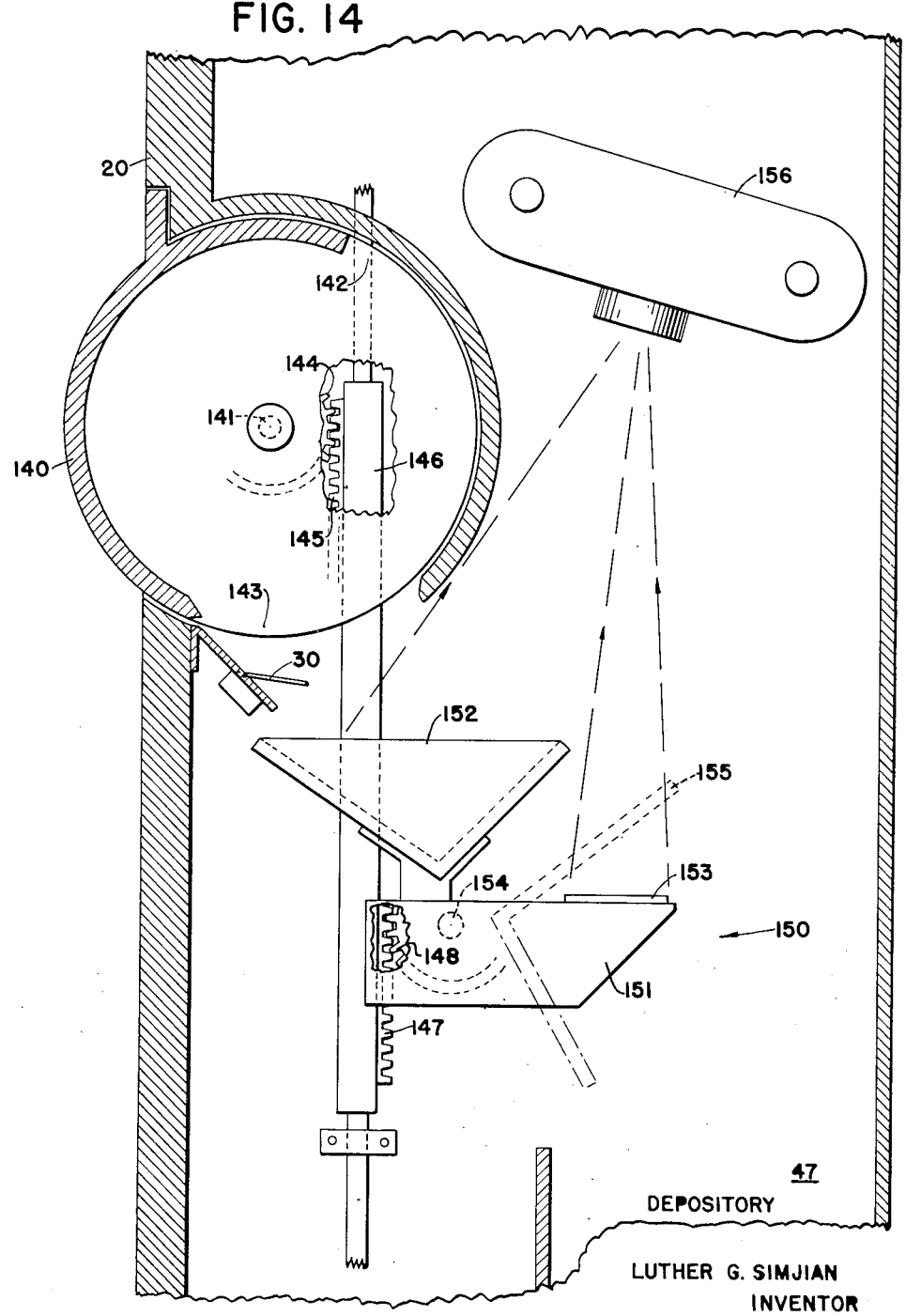

FIGS. 12 and 13 show side views of two of the cams associated with the alternate arrangement shown in FIG. 11, and FIG. 14 is a cross sectional view of a bank depository machine and includes a scale for determining the weight of the deposited envelope.

Referring now to FIGS. 1 to 10, inclusive, the machine comprises a container 20 which houses all the operating mechanism. A shelf 21 is positioned at the front of the machine for receiving envelopes which are to be inserted into the first receiving means. A coin slot 22 is positioned at the right of shelf 21 for receiving coins to pay for the registry fee and to start the operation of the machine. Also at the front of the machine is a receptacle 23 for holding an identifying ticket which acts as a receipt for the deposited envelope. The usual coin return slot 24 is provided for the return of unused coins.

Figure 2:
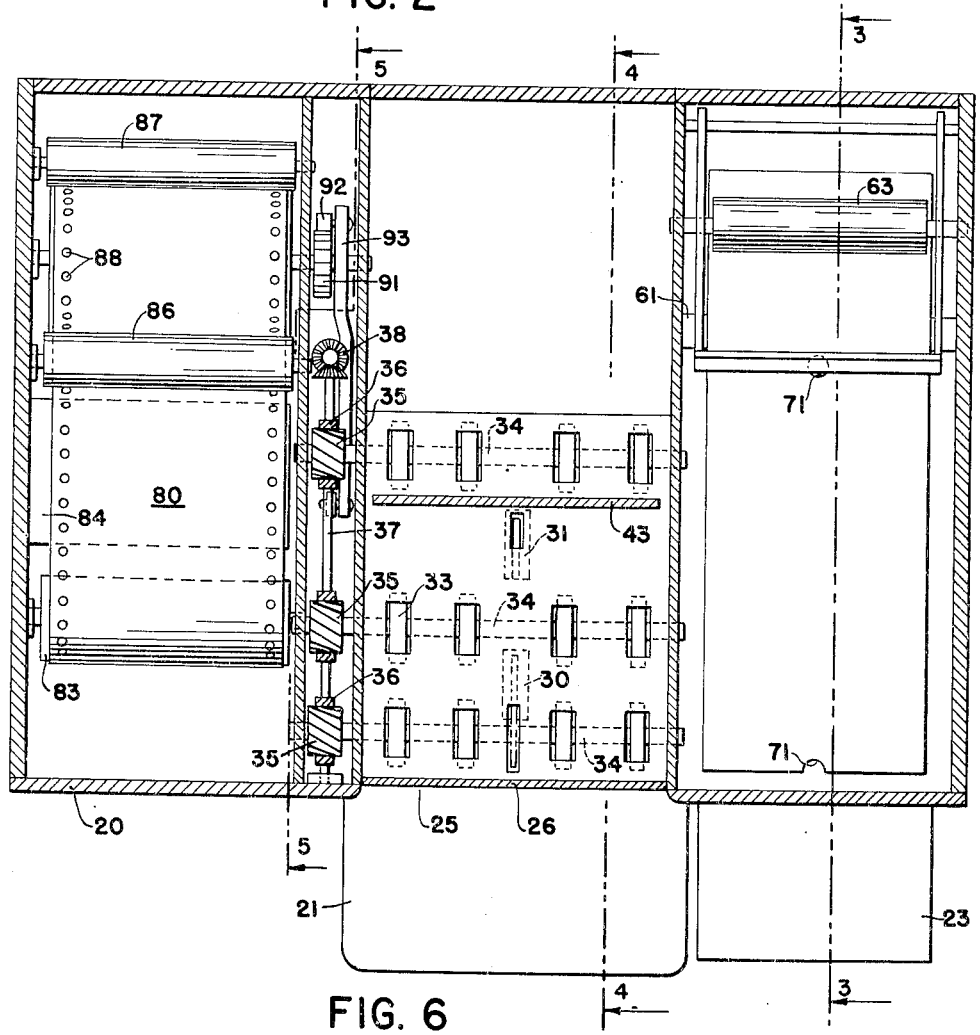
FIG. 2 is a cross sectional view taken along line 2—2 of FIG. 4 and showing the recording chamber, the ticket dispensing means, and the recording tape within the machine.
Figure 6:
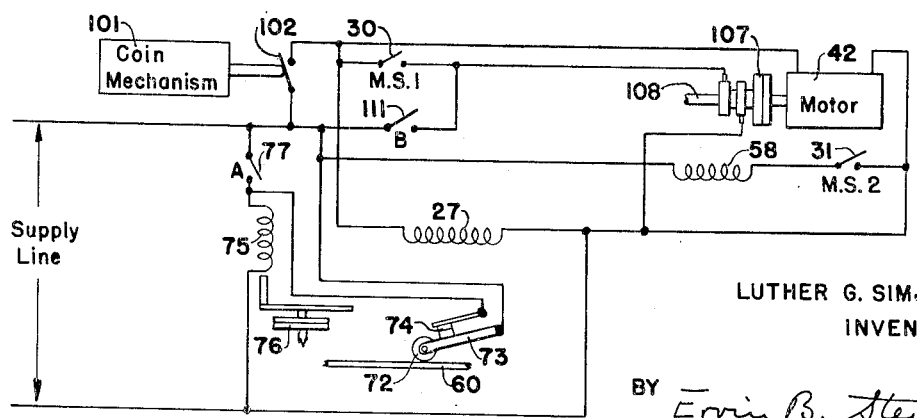
FIG. 6 is a schematic diagram of connections of the electrical wiring of some of the controls.

Referring now specifically to FIGS. 2 and 4, the shelf 21 is connected to a slot 25 which is closed by a vertical stop 26. Stop 26 is lowered by a solenoid 27 which is operated as soon as the money is deposited in slot 22. When stop 26 is lowered, access is provided to a recording chamber 28 which contains microswitches 30 and 31 and a plurality of rollers 32 which move the envelope through the machine. The lower rollers 33 are driven by shafts 34 which in turn are rotated by helical gears 35 meshing with other helical gears 36 secured to a common shaft 37. Shaft 37 is driven by miter gears 38 which are connected to a vertical shaft 40 (see FIG. 10) driven by a short shaft 41 which receives its power from a motor 42.

The recording chamber 28 also includes a second stop 43 which is mounted just back of microswitch 31. The second stop 43 is operated by a connecting rod 44 which is controlled by a cam follower 45 (see FIG. 9) on a cam 46.

At the rear of the recording chamber 28 a large chamber 47 is provided for receiving all the envelopes deposited in the machine. Access to this letter hopper is provided by a rear door 48 which may be opened only by the proper post office officials. In order to place an identifying mark on the envelopes, a stamp 50 is mounted directly above the recording chamber 28 and is connected by one or more rods 51 (see FIG. 3) to an operating means in the base of the machine. The operation of this stamp (and two others which will be described later) may be controlled by any convenient power means. The operating means shown in FIGS. 3, 7, and 10, comprise a scotch yoke 52 moved by a stub shaft 53 eccentrically mounted on a wheel 54 which is secured to a shaft 55 connected to a one-revolution clutch 56. Clutch 56 is controlled by the usual well-known lever arrangement 57 which is operated by a solenoid 58. Solenoid 58 is connected in series with microswitch 31 so that, as soon as the envelope is run against the second stop 43, causing the operation of microswitch 31, the one-revolution clutch 56 is engaged and the stamp 50 is lowered into contact with the envelope, placing an identifying number thereon.

Referring now to FIGS. 2 and 3 a roll of tickets 60 is mounted in a separate compartment on the right hand side of the machine. The ticket roll is mounted on a horizontal shaft 61 and the ticket paper is threaded over a driven cylinder 62 and under a resiliently mounted friction roller 63. The ticket paper passes under a cutting knife 64 and then moves onto a table 65 which is directly under a second stamping means 66. The knife 64 is hinged on a shaft 67 and is connected to a lever 68 which also control stamp 66. When the one-revolution clutch 56 is operated, rod 51 is moved in a vertical direction, cutting off the ticket by means of knife 64, and stamping identifying data on the ticket by means of stamp 66. As soon as the ticket is cut off it falls onto an incline 70 and moves to receptacle 23. This ticket is removed by the depositor and is retained by him as a receipt. As will be seen from FIG. 2 the ticket paper is prepunched with a series of holes 71, these holes being engaged by a roller 72 secured to an arm 73 of a microswitch 74. When roller 72 moves into the aperture 71 switch 74 is open and current cannot flow from the supply line (see FIG. 6) through solenoid 75 to engage a friction clutch 76 to move roller 62. Motion of the ticket paper is started by the closing of contacts 77 which are operated by cam 46 (FIG. 9). As soon as switch 77 is closed roller 72 moves out of the hole in the paper and switch 74 is closed. Switch 77 remains closed only for the duration of part of a revolution of cam 46 but it remains closed long enough for the roller 72 to move out of the hole so that the motion of the paper continues until the next succeeding hole is sensed by roller 72 and switch 74 is opened. This action deenergizes solenoid 75 and disengages clutch 76 thereby stopping the paper. The motor which runs the driven section of clutch 76 is not shown in the drawing since it is a conventional type of motor and is well-known in the art.

Figure 5:
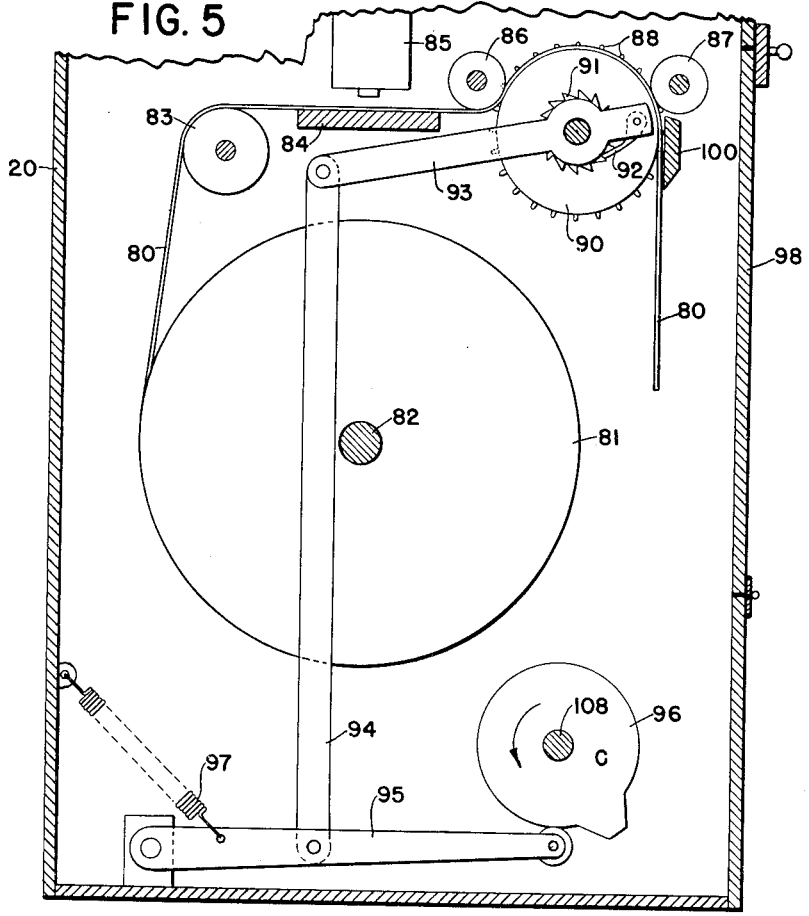
FIG. 5 is a cross sectional view of the recording means which places identifying data on a tape and is taken along line 5—5 of FIG. 2.

As each letter is entered into the machine a ticket is issued to the depositor bearing an identifying number. This same number is stamped on the envelope by stamp 50 and by means of a third stamp 85, the same number is imprinted on a permanent record tape 80 which is positioned in a separate compartment on the left side of the machine. This tape is shown in FIGS. 2 and 5 and may consist of the well-known edge perforated paper which is in general use in recording and tabulating machines. The paper is unwound from a storage roll 81 which turns on a horizontal shaft 82. The paper passes over an idler roller 83 and then over a table 84 which is mounted directly under the third stamp 85. The paper then passes under idlers 86 and 87 being engaged by sprockets 88 secured to a cylinder 90. The recording paper 80 is moved only a short distance, about one-third of an inch, so that a large number of numbers may be recorded in a small area. It has been found convenient to move the paper on cylinder 90 by means of a ratchet wheel 91 engaged by a pawl 92. Pawl 92 is rockably mounted on a lever 93 which is moved by a rod 94 and a cam lever 95, energized by a rotating cam 96. The cam is held in engagement by a spring 97 mounted between the cam and a portion of the cabinet 20. Each time the cam is rotated, ratchet wheel 91 is moved one tooth and the paper is moved a corresponding distance. The paper 80 accumulates in the machine until it is removed by a post office operator. The removal is accomplished by opening door 98, pulling the paper 80 downwardly, rotating wheel 90 until the last stamped number appears, and then tearing off by means of a tear knife 100. Since the numbers are positioned close together it will be necessary to remove the record only once or twice a day. The paper is made wide enough so that other identifying data, such as the final destination of the letter, may be entered after the recorded numbers by the post office employee.

The operation of this device is as follows: It will be noted that in its inoperative position the entrance to the recording chamber is closed by stop 26. When the proper number of coins is deposited in the coin slot, a coin mechanism 101 (FIG. 6) is actuated and closes a motor switch 102. The closing of this switch starts motor 42 and sends current through solenoid 27 which lowers stop 26 and permits the depositor to push an envelope into slot 25 against the arm of microswitch 30. When motor 42 is started it turns shaft 103, pulley 104, V belt 105, and a large pulley 106 on short shaft 41. The above action turns vertical shaft 40 and rollers 32 but does not move the cam shaft nor the scotch yoke 52. As soon as the envelope actuates microswitch 30, current is sent from the upper supply line through the microswitch contacts to slip rings on a magnetic clutch 107. The current through the clutch winding engages the clutch elements and shaft 108 (FIG. 10) is caused to rotate turning cams 46, 109, and 96. The rotation of rollers 32 move the envelope from the entrance slot 25 into the recording chamber 28 and up to stop 43 thereby actuating microswitch 31. During this time interval cams A, B, and C, (46, 109, and 96) all rotate in the direction indicated. Cam B lowers its cam follower 110 shortly after the start of the rotation and thereby closes switch 111 which is in parallel with switches 102 and 30. It will be noted that switch 111 remains closed for the entire revolution of shaft 108 thereby energizing clutch 107 for the entire duration of the operating cycle even though switches 30 and 102 may be opened in the meantime. Cam A lowers its cam follower 45 only after one-half revolution of shaft 108 thereby giving sufficient time for the envelope to be correctly positioned against stop 43.

When the second microswitch 31 is operated, current is sent through solenoid 58 which operates a trigger mechanism 57 and starts the one-revolution clutch 56. When this clutch is engaged, eccentric stub 53 is turned and the scotch yoke 52 is lowered, thereby operating all three stamps 66, 85, and 50 and stamping the envelope, the identifying ticket, and the permanent record tape 80 all with the same number.

The A cam 46 is adjusted so that its cam follower 45 will be lowered just after the stamping operation and rod 44 will be operated to lower stop 43 and permit the rollers 32 to roll the envelope into hopper 47. The closure of switch 77 operates solenoid 75 and clutch 76 to move another length of ticket paper into stamping position as previously described.

At the end of the machine cycle the C cam 96 (see FIG. 5) moves cam follower 95 downwardly and advances paper 80 one space as described above. At the very end of the machine cycle the B cam 109 opens contact 111 as its cam follower is moved to its normal position. The opening of contacts 111 disengages clutch 107 and stops the rotation of shaft 108. The shaft which is connected to clutch 76 is arranged to run much slower than either of shafts 103 or 41 and since the paper from roll 60 must move a considerable distance before follower 72 senses a new hole, this last operation will be the last one performed in the machine. Switch 74 is arranged to control the coin mechanism 101 so that the coins introduced are released into the coin hopper and switch 102 is opened, thereby cutting off the electrical supply to motor 42, closing stop 26, and normalizing the machine.

The machine shown in FIG. 11 is an alternate arrangement of the machine described above and includes additional means which photographs both sides of letter 118 after it has been imprinted with identifying data. This machine includes the recording chamber 28, the two microswitches 30 and 31 and all the controls associated with them as previously described. At the rear of the last rollers 33, an inclined transparent shelf 120 is mounted, terminated by a stop 121 which retains the letter while the camera film is exposed. Mirrors 122 and 123 are mounted adjacent to shelf 120 and reflect the image of letter 118 toward a third mirror 124. This last mirror directs the light from the letter to a lens 125 of a camera 126, positioned near the front panel of the machine.

Camera 126 is the usual microfilm type of camera having film moving controls which are well-known in the art. A shutter 127 is positioned in the lens housing in the usual manner and is operated by a rod 128 which is fastened to cam follower 130 (see FIG. 12) resting on cam 131. Cam 131 is secured to cam shaft 108 and is rotated along with the operating cams previously described. Cam follower 130 is operated near the end of the cam shaft revolution and is resiliently stressed by a spring 132.

Stop 121 which retains the letter on shelf 120 during the film exposure is secured to two levers 133 (one on each side of the shelf) and the levers are controlled by a vertical rod 134 whose lower end is fastened to cam follower 135 (see FIG. 13), resting on cam 136. This cam is also secured to cam shaft 108. Cam 136 operates its cam follower 135 and thereby lowers stop 121 at the very end of the cam shaft rotation, releasing letter 118 which then falls into hopper 47.

The operations of entering the letter, imprinting it with identifying data, issuing a ticket, and imprinting a tape with the same data are all a part of this machine and are described above.

The machine shown in FIG. 14 is a modification of the arrangement just described and is adapted to receive larger packages such as would be deposited in a bank after closing hours. It comprises the usual rotatable receiving box 140 which is opened by a key and turns on end-stub shafts 141. When the cylinder 140 is turned, an opening 142 is made available to the depositor and an envelope or a bag containing articles to be deposited is placed in the cylinder. When the cylinder 140 is turned to its closed position, the deposited article drops through opening 143 to a position where it is accessible only to the bank officials.

The present invention includes a gear or gear sector 144 secured to the cylinder 140 and meshing with a rack 145. The rack is secured to a vertical rod 146 which extends downwardly to the bottom of the machine and is secured to a second rack 147, meshing with a second gear 148. This second gear is secured to a weighing scale 150 which includes a base 151, a hopper 152, and an indicating dial 153, which shows the weight of an article placed in the hopper. When cylinder 140 is in its closed position, the scale is in its weighing position, as shown in FIG. 14, and hopper 152 is ready to receive an article from the cylinder. When the cylinder is opened, the rotation of the cylinder is transferred by rod 146 and its associated gear means to the scale 150, turning it about a shaft 154, in a clockwise direction as viewed in FIG. 14. When the cylinder is fully opened the hopper is in the position shown by dotted lines 155, permitting the previously deposited article to be deposited in the depository hopper 47.

A camera 156, similar to camera 126, is mounted within the machine so that when the film is exposed, the image of the deposited article is recorded on the film, as well as the image of the indicating dial 153.

The operating sequence of this arrangement is as follows: The depositor inserts a key in the lock (not shown) and opens it, thereby starting motor 42. The cylinder is opened and at the same time a previously deposited article is dropped into the depository hopper 47. Next, the article to be deposited is placed in the opening 142 and the cylinder is turned to its closed position. This action transfers the article to scale hopper 152 and operates microswitch 30. As described above, the closing of switch 30 causes the clutch 107 (see FIG. 6) to be engaged and cam shaft 108 is turned one-revolution. In this latter form of the invention the A cam 46 is necessary only to close contacts 77 to start the ticket paper 80, rod 44 is omitted because there is no second stop. Also, solenoid 25 is omitted because there is no first stop 26. However, the B cam 46 which closes contacts 111 to keep the clutch in operation is necessary, as is the scotch yoke 52, 53, which imprints the ticket paper and the tape 80. The tape mechanism is the same as described above. This includes the C cam 96, ratchet mechanism 91, 92, and the stamp 85.

The camera 156 includes a shutter for exposing the film which is similar to shutter 127 as shown in FIG. 11. Shutter 127 is operated by a rod 128 fastened to cam follower 130 resting on cam 131 which is secured to cam shaft 108 as described above. It will be obvious from the description of the mechanism that cams A and E are omitted in this latter form of the invention.

For features described and disclosed but not claimed, reference is made to the application and patent referenced heretofore.

While there have been described and illustrated, specific forms of the invention, it will be obvious that various changes and modifications can be made therein without departing from the field of the invention which should be limited only by the scope of the appended claims.

What is claimed is:

1. In a depository machine which is adapted to receive an article for deposit and which includes image recording means and weighing means, the combination of:

an enclosure;
said enclosure provided with an opening for receiving therein a deposit intended for storage;
a storage receptacle disposed for receiving the deposit received in said opening and storing said deposit inaccessible for surreptitious removal therefrom;
a weighing means disposed along the path of said deposit from said opening to said receptacle for receiving said deposit prior to its reaching said receptacle;
indicating means cooperating with said weighing means for displaying data corresponding to the weight of the deposit when the latter is disposed on said weighing means;

image recording means located for viewing the deposit disposed on said weighing means and also the data indicative of the weight of the deposit;

control means connected to said recording means for actuating the image recording means in response to the receipt of the deposit in said opening whereby to produce correlated images of said deposit and its weight, and means causing said deposit to be moved from said weighing means and passed to said receptacle prior to another deposit becoming disposed on said weighing means.

2. In a depository machine which is adapted to receive an article for deposit and which includes image recording means and weighing means, the combiantion of:

an enclosure;

said enclosure provided with an opening for receiving therein a deposit intended for storage;

a storage receptacle disposed in said enclosure for receiving the deposit received in said opening and storing said deposit inaccessible for surreptitious removal therefrom;

a weighing means disposed along the path of said dedeposit from said opening to said receptacle for receiving said deposit prior to its reaching said receptacle;

indicating means cooperating with said weighing means for displaying data corresponding to the weight of the depsoit when the latter is disposed on said weighing means;

image recording means located for viewing the deposit disposed on said weighing means and also the data indicative of the weight of the deposit;

control means connected to said recording means for actuating the image recording means in response to the receipt of the deposit in said opening whereby to produce correlated images of said deposit and its weight, and means causing said deposit to be moved from said weighing means and passed to said receptacle prior to another deposit becoming disposed on said weighing means.

3. In a depository machine which is adapted to receive an article for deposit and which includes image recording means and weighing means, the combination of:

an enclosure;

said enclosure provided on its outer surface with an opening for receiving a deposit intended for storage;

a storage receptacle disposed for receiving the deposit received in said opening and maintaining said deposit inaccessible for surreptitious removal therefrom;

a weighing means disposed along the path of said deposit from said opening to said receptacle for receiving said deposit prior to its reaching said receptacle;

indicating means cooperating with said weighing means for displaying data corresponding to the weight of the deposit when the latter is disposed on said weighing means;

image recording means which includes a photographically sensitive medium located for viewing the deposit disposed on said weighing means and also the data indicative of the weight of the deposit;

control means connected to said recording means for actuating the image recording means in response to the receipt of the deposit at said opening whereby to produce on said medium correlated images of said deposit and its weight, and means causing said deposit to be moved from said weighing means and passed to said receptacle prior to another deposit becoming disposed on said weighing means.

4. In a depository machine as set forth in claim 3 wherein said images are disposed on the same frame of said medium.

5. In a depository machine which is adapted to receive an article for deposit and which includes image recording means, receipt issuing means, and weighing means, the combination of:

an enclosure;

said enclosure provided with an opening for receiving therein a deposit intended for storage;

a storage receptacle disposed for receiving the deposit received in said opening and storing said deposit inaccessible for surreptitious removal therefrom;

a weighing means disposed along the path of said deposit from said opening to said receptacle for receiving said deposit prior to its reaching said receptacle;

indicating means cooperating with said weighing means for displaying data corresponding to the weight of the deposit when the latter is disposed on said weighing means;

image recording means located for viewing the deposit disposed on said weighing means and also the data indicative of the weight of the deposit;

control means connected to said recording means and receipt issuing means for actuating the respective means in response to the receipt of the deposit in said opening, whereby to produce correlated images of said deposit and its weight and cause issuance of a receipt;

and means causing said deposit to be moved from said weighing means and passed to said receptacle prior to another deposit is disposed on said weighing means.

6. In a depository machine which is adapted to receive an article for deposit and which includes image recording means, receipt printing and issuing means, and weighing means, the combination of:

an enclosure;

said enclosure provided with an opening for receiving therein a deposit intended for storage;

a storage receptacle disposed in said enclosure for receiving the deposit received in said opening and storing said deposit inaccessible for surreptitious removal therefrom;

a weighing means disposed along the path of said deposit from said opening to said receptacle for receiving said deposit prior to its reaching said receptacle;

indicating means cooperating with said weighing means for displaying data corresponding to the weight of the deposit when the latter is disposed on said weighing means;

image recording means located for viewing the deposit disposed on said weighing means and also the data indicative of the weight of the deposit;

control means connected to said recording means and receipt printing and issuing means for actuating the respective means in response to the receipt of the deposit in said opening, whereby to produce correlated images of said deposit and its weight and cause issuance of a printed receipt to a position accessible from the exterior of the enclosure;

and means causing said deposit to be moved from said weighing means and passed to said receptacle prior to another deposit received in said opening is disposed on said weighing means.

7. In a depository machine as set forth in claim 6 wherein said receipt printing and issuing means includes means for printing also a record which is stored in the machine.

8. In a depository machine which is adapted to receive an article for deposit and which includes image recording means, receipt printing and issuing means, and weighing means, the combination of:

an enclosure;

an opening disposed on said enclosure and provided with movable means for selectively exposing or concealing said opening whereby to cause said opening to assume an exposed or concealed condition;

a storage receptacle located in said enclosure and the receptacle receiving the deposit in response to the operation of the movable means changing said opening from its exposed to its concealed condition;

a weighing means disposed along the path of said deposit from said opening to said receptacle for receiving said deposit in response to said operation of the movable means;

indicating means cooperating with said weighing means for displaying data corresponding to the weight of the deposit when the latter is disposed on said weighing means;

image recording means located for viewing the deposit disposed on said weighing means and also the data indicative of the weight of the deposit;

control means connected to said recording means and to said receipt printing and issuing means for actuating the respective means in response to the deposit passing from said opening to the weighing means, whereby to produce correlated images of said deposit and its weight and cause also issuance of a printed receipt to a position accessible from the exterior of the enclosure;

and said movable means connected to means coacting with said weighing means for causing said deposit to be moved from said weighing means to said receptacle in response to the opening being changed from its concealed condition to its exposed condition preparatory to the depository machine being capable of accepting a succeeding deposit.

References Cited in the file of this patent

UNITED STATES PATENTS

| | | |
|---|---|---|
| 1,105,484 | Cannon | July 28, 1914 |
| 1,890,648 | Hinman | Dec. 13, 1932 |
| 2,572,003 | Binns et al. | Oct. 23, 1951 |
| 2,604,967 | Murtagh | July 29, 1952 |
| 2,736,630 | Cooper | Feb. 28, 1956 |

FOREIGN PATENTS

| | | |
|---|---|---|
| 605,678 | Germany | Nov. 16, 1934 |